Dec. 22, 1953    S. G. MARGLES ET AL    2,663,400
MOVING STAIRWAY
Filed Oct. 13, 1950    2 Sheets-Sheet 1
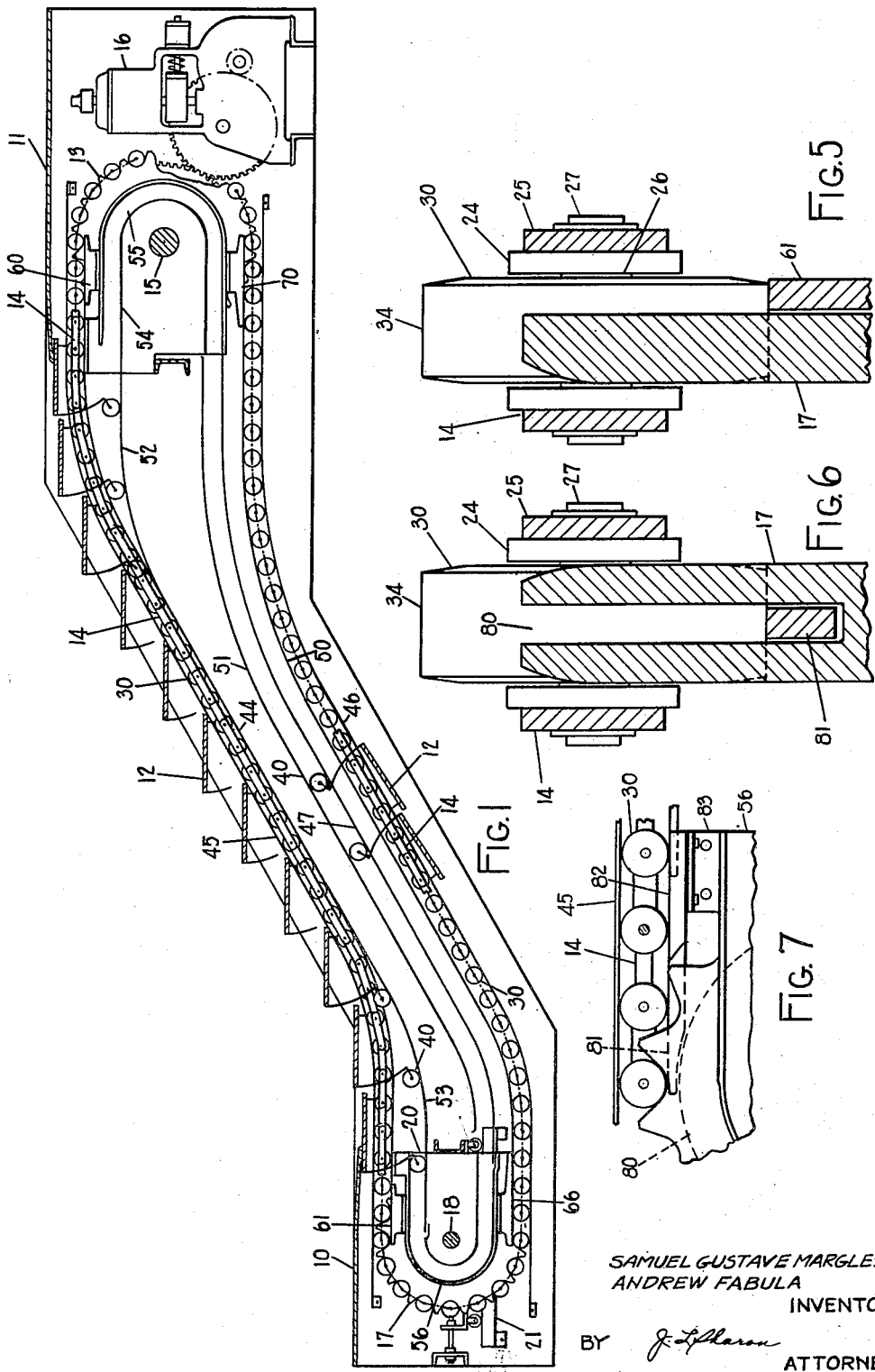
SAMUEL GUSTAVE MARGLES
ANDREW FABULA
INVENTORS
BY *J. L. Sharon*
ATTORNEY Dec. 22, 1953     S. G. MARGLES ET AL     2,663,400
MOVING STAIRWAY
Filed Oct. 13, 1950     2 Sheets-Sheet 2
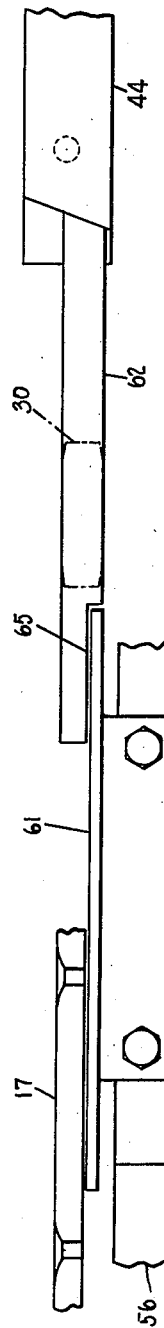
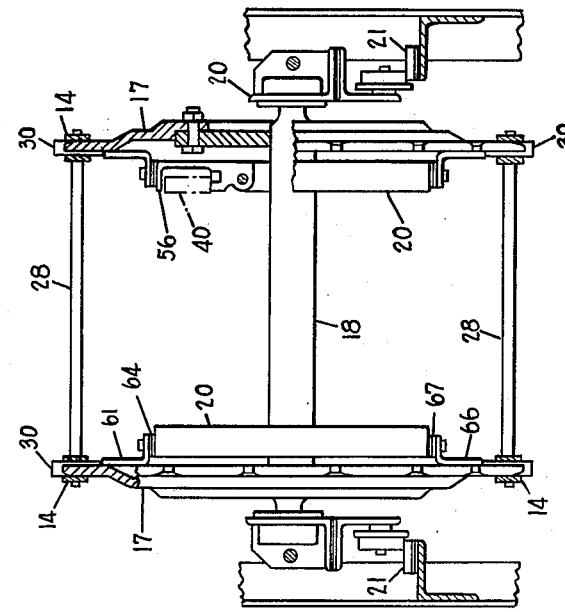
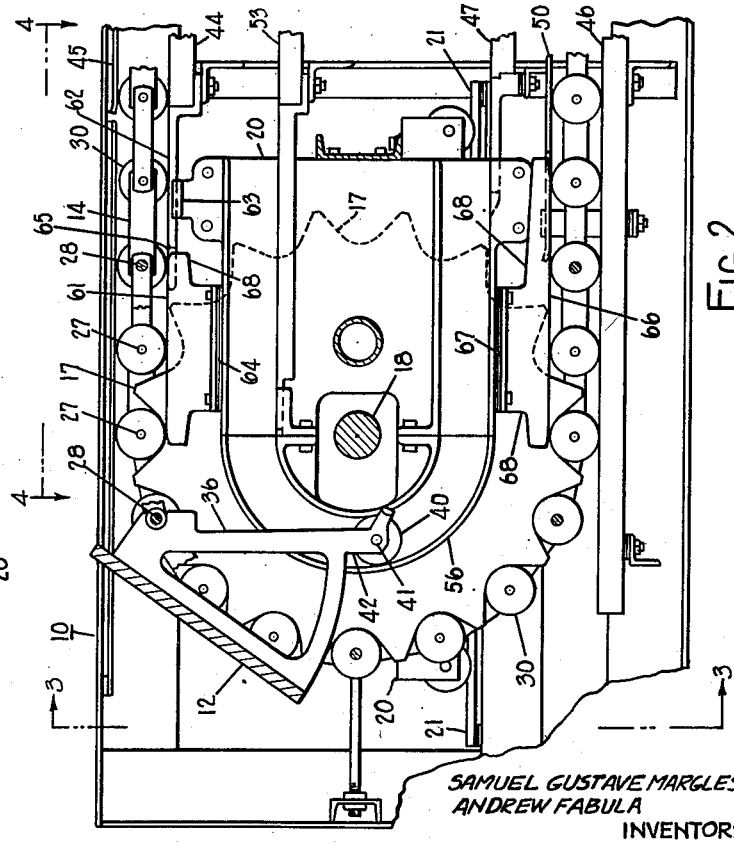
SAMUEL GUSTAVE MARGLES
ANDREW FABULA
INVENTORS
BY J. L. Pharen ATTORNEY

Patented Dec. 22, 1953

UNITED STATES PATENT OFFICE

2,663,400

MOVING STAIRWAY

Samuel Gustave Margles, Brooklyn, N. Y., and Andrew Fabula, Hohokus, N. J., assignors to Otis Elevator Company, New York, N. Y., a corporation of New Jersey Application October 13, 1950, Serial No. 189,943

2 Claims. (Cl. 198—18)

The invention relates to moving stairways.

Moving stairways comprise an endless series of steps which are moved from one landing to another for the purpose of conveying passengers. In the usual construction the steps are connected together by chains, known as running gear chains, one on each side of the stairway. The chains are driven at the upper end of the stairway by sprocket wheels, these wheels in turn being driven by the stairway driving motor. The steps are supported by wheels which between the ends of the stairway run on tracks, both on the upper run and the return run. Also, up thrust tracks are provided for the wheels both on the upper run and the return run. There is an advantage in arranging the supporting wheels for the front ends of the steps between the chain links, making these wheels of small diameter and providing wheels of the same size on the in-between chain pins. All of these wheels then run on the supporting tracks, and all of them mesh with the teeth of the driving sprocket wheels. With this arrangement, it is also of advantage to pass the running gear chains around idler sprocket wheels at the lower end of the stairway. Thus all of the wheels also mesh with the teeth of the idler sprocket wheels.

The invention is directed to stairways of the above character and the object of the invention is to minimize noise incident to the transition of the running gear chains between the tracks and the sprocket wheels.

Providing the chain wheels with tires of a composition material such as rubber has greatly aided in reducing noise. However, as the chain wheel tracks are in line with the sprocket wheels, they cannot be extended to the vertical center line of the sprocket wheels, which is desirable. The invention involves the provision of a guide for the chain wheels extending from the end of the chain wheel track to the vertical center line of the sprocket wheel. This guide is preferably provided on the return run between the end of the up thrust track and the sprocket wheel as well as the upper run between the supporting track and the sprocket wheel. In order that the guide may support the chain, the relative dimensions of the sprocket wheel and chain wheels are such that the chain wheels are wider than the supporting surface of the sprocket wheel, enabling part of each chain wheel to contact the guide between the end of the track and the center line of the sprocket wheel to effect the desired transition. For example, in one arrangement, the chain wheels are wider than the sprocket wheel and the guide is positioned at the side of the sprocket wheel, preferably on the side toward the center line of the stairway. With such arrangement, the chains are guided laterally by the outer chain links of each chain in conjunction with the sprocket wheels and the guides contact the portions of the chain wheels extending beyond the sprocket wheels toward the center line of the stairway.

The various features and advantages of the invention will be gained from the above statements and from the following description and appended claims.

In the drawings:

Figure 1 is a somewhat schematic view in side elevation, with parts removed and parts in section, of a moving stairway embodying the invention;

Figure 2 is a view in longitudinal section of the lower end of the stairway of Figure 1;

Figure 3 is an end and vertical sectional view of the lower end of the stairway as viewed along the line 3—3 of Figure 2;

Figure 4 is a fragmental plan view, as viewed along the line 4—4 of Figure 2, of the arrangement of the guide for effecting the transition between the sprocket wheel and the track;

Figure 5 is a fragmental sectional detail of the sprocket wheel and transition guide;

Figure 6 is a fragmental sectional detail similar to Figure 5 of another embodiment of the invention; and Figure 7 is a detail of the mounting of the transition guide of Figure 6.

Referring first to Figure 1, the moving stairway extends between a lower landing 10 and an upper landing 11. The stairway comprises an endless series of steps 12 driven at the upper end of the stairway by means of sprocket wheels 13 through running gear chains 14, a sprocket wheel and running gear chain being arranged on each side of the stairway. The sprocket wheels are mounted on and driven by the main drive shaft 15, driven in turn by an electric motor 16. At the lower end of the stairway, the running gear chains pass around idler sprocket wheels 17 mounted on a shaft 18 in turn rotatably supported by a longitudinally movable carriage 20. The carriage runs on tracks 21 and is biased as by a spring (not shown) to maintain tension in the running gear chains.

Referring now to Figures 2, 3, 4 and 5, each of the running gear chains 14 comprises a series of pairs of links, arranged alternately as inner and outer pairs. The links 24 of the inner pairs are wider than the links 25 of the outer pairs to support bushings 26 for the chain pins 27 and step axles 28, the step axles being of the same diameter as the chain pins. A wheel 30 is mounted on each bushing, these wheels being of the ball bearing type and located centrally between the links. These chain wheels are provided with rubber tires 34 vulcanized to the rims and tapered toward their tread surfaces. These chain wheels both on the chain pins and step axles are of the same size and construction, a three inch diameter wheel having been found satisfactory.

Each step comprises a frame made up of a pair of step yokes 36 to which the step riser and tread plate are secured. The step axle 28 extends across the step frame and is mounted in bushings, one on each side of the frame. The running gear chains are outside the step frame, the step axle chain wheels 30 being mounted on the ends of the axle. These wheels support the front end of the step. Each step has two trailer wheels 40 which are in the form of rubber tired ball bearing wheels of the same size and construction as the chain wheels. These trailer wheels are mounted on stub shafts 41 secured to extensions 42 of step yokes 36 and support the rear end of the step.

As indicated diagrammatically in Figure 1, a track system is provided for the steps between the ends of the stairway for both the upper run and the return run. The track system for the upper run comprises for each side of the stairway a supporting track 44 and an up thrust track 45 for the chain wheels. A supporting track is also provided for the trailer wheels, this track being formed integral with the chain wheel supporting track on the incline. For the return run, each side of the stairway has a supporting track 46 for the chain wheels and a supporting track 47 for the trailer wheels. An up thrust track 50 is provided on the return run for the chain wheels. Also a return run up thrust track 51 is provided on one side of the stairway for the trailer wheels. The upper run tracks are curved as they reach the ends of the stairway for effecting the transition of the steps between the incline and the horizontal run. These curved portions of supporting tracks for the chain wheels and trailer wheels are separated to provide the proper curvature of effecting the desired gradual transition of the steps from step to platform formation, or vice versa, depending on the direction of step movement. These curved portions of trailer wheel track are designated 52 at the upper end and 53 at the lower end. A channel shaped guide 54 with a semi-circular end 55 is provided on each side of the stairway for the trailer wheels at the upper end of the stairway. Similar channel shaped guides 56 with semi-circular ends are provided for the trailer wheels at the lower end of the stairway. The lower end guides 56 are mounted on the movable carriage 20.

The chain wheels 30 mesh with the sprocket teeth to drive the running gear chains as the chains pass around the driving sprocket wheels 13. The transition of the chain on each side of the stairway between the upper run supporting track 44 and sprocket wheel 13 is effected by supporting the chain wheels on a tangential guide 60. Similarly, the chain wheels mesh with the sprocket teeth of the idler sprocket wheels 17 as the steps pass around the lower end of the stairway. As at the upper end, the transition of the chain on each side at the lower end of the stairway between the upper run supporting track 44 and sprocket wheel 17 is effected by supporting the chain wheels on a trangential guide 61. The arrangement is similar at each end of the stairway and is illustrated in more detail for the lower end in Figures 2, 3, 4 and 5.

Each of the tracks 44 at the lower end of the stairway is provided with a horizontal extension 62 slidably supported on a bracket 63 carried by the carriage 20, this extension supporting the chain wheels up to the sprocket wheel (see Figures 2 and 4). From this point to the center of the sprocket wheel, the chain wheels are supported on the tangential guide. As may be best seen from Figure 5, the construction is such that the chain wheels 30 are wider than the sprocket wheel 17. The chain wheels and sprocket wheels are mounted so that the outer faces of the sprocket wheels cooperate with the outer side chain links to guide the running gear chains onto and off the sprocket wheels. The tangential guide 61 on each side of the stairway is positioned along the inner face of the sprocket wheel, and extends from the extension 62 to a point a short distance beyond the vertical center line of the sprocket wheel. The tangential guide, which is in the form of an angle member, is mounted on the trailer wheel end guide 56 as by bolts and is thus movable with carriage 20. Shims 64 are provided for adjusting the tangential guide to the desired vertical height. The portions of the chain wheels which extend inwardly from the sprocket wheel run on this guide, thus supporting the running gear chain in its transition between the track and the sprocket wheel. The guide overlaps the extension 62, a portion 65 of the extension being cut away for this purpose. The amount of this overlap is ample to allow for any movement of the carriage in taking up wear. Also the ends of the guide and extensions are slightly chamfered to insure gradual transitions between the guide and the sprocket wheel and between the guide and the track extension.

A similar guide 66 is provided on each side of the stairway at the bottom of sprocket wheel 17. Each of these guides also is in the form of an angle and is bolted to the bottom of the trailer wheel end guide 56. Adjusting shims 67 are provided. The guide overlaps both the up thrust track 50 and the sprocket wheel, extending to a point a short distance beyond the vertical center line of the sprocket wheel. Also the ends of the guide and up thrust track are chamfered. Portions of both guides 61 and 66 are cut away as at 68 for clearance purposes.

The tangential guides 60 at the upper end of the stairway are similarly arranged. On each side of the stairway the guide is mounted on the top of the trailer wheel end guide 54 and overlaps both the upper run supporting track 44 and the sprocket wheel 13 extending to a point a short distance beyond the sprocket wheel's vertical center line. A guide 70 is also provided for the return run on each side of the upper end of the stairway and is mounted on the bottom of guide 54. It overlaps both the return run up thrust track 50 and the sprocket wheel 13 and extends to a point a short distance beyond the vertical center line of the sprocket wheel.

Assuming an upward moving stairway, as the chain wheels 30 leave their supporting track 44 at the upper end of the stairway, they run onto the tangential guide 60, on which they are supported to the vertical center line of the sprocket wheels. This eliminates any whipping action of the running gear chains due to the chain pitch, maintaining the center line of the chain tangential to the pitch line of the sprocket wheel, thus seating the chain wheels in the sprocket teeth with a minimum of noise. A similar action takes place at the lower end of the stairway in case of a descending stairway. The chain wheels are supported on the guides from the end of tracks 44 to the vertical center line of the sprocket wheels, seating the chain wheels in the sprocket wheels with a minimum of noise. The tangential guides for the return run prevents the chain sticking to the sprocket wheels and then snapping back onto the return run supporting tracks as they let go. Referring to the guides 66 at the lower end of the stairway, with the stairway descending, should the chain links tend to stick to the sprocket wheels as they pass the vertical center line, they are forcibly disengaged by the engagement of the chain wheels with the guides, thus causing the transition of the chain rollers from the sprocket wheels to be gradually effected without noise. The guides 70 at the upper end act in a similar manner when the stairway is ascending. Guides 60 and 61 serve a similar purpose, preventing the chains being carried around past the vertical center line of their respective sprocket wheels and being forced out by the engagement of the chain wheels with the upper run supporting track, with the attendant noise. Assuming an ascending stairway for example, should the chain links tend to stick to the lower end sprocket wheels as they pass the vertical center line, they are forcibly disengaged by the engagement of the chain wheels with the guides, causing a smooth transition to the supporting tracks without attendant noise.

The tangential guides at the lower end of the stairway are particularly important as there is greater tendency for the chains to stick at this end. At the upper end of the stairway, the chain tensions are much greater, thus tending to prevent the sticking of the chains to the sprocket wheels. Furthermore the driving machinery is at the upper end and tends to drown out any noise incident to chain transitions. For this reason, in certain installations, particularly where cost is a factor, the tangential guides at the upper end of the stairway may be omitted, or at least the return run guides 70 omitted. Where the invention is applied to existing installations, the existing sprocket wheels may be cut away if desired to provide space for the tangential guides.

Various changes may be made in the above described construction, especially with reference to the relationship of the tangential guides to the sprocket wheels. For example, the tangential guides may be positioned along the outside of the sprocket wheels instead of the inside. Also, as illustrated in Figure 6, the sprocket wheel may be formed with a circumferential groove 80 to admit a tangential guide 81. In this case the centers of the chain wheels run on the guide in making the transition and the chain links on each side of the chain cooperate with the sprocket wheels in guiding the chain laterally. With such arrangement, the tangential guide may be formed as a part of the extension of the supporting track 82, in turn supported by bracket 83 mounted on the trailer wheel end guide 56, as illustrated in Figure 7. Such an arrangement is especially suitable for stairways having but a single running gear chain extending centrally of the stairway.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:
1. A moving stairway comprising; a plurality of steps; a pair of running gear chains, one on each side of the stairway, connecting said steps together; a pair of sprocket wheels, one on each side of the stairway at one end thereof, around which the chains respectively pass; a chain wheel in each chain for each step arranged between side links of the chain for supporting the step; additional chain wheels in each chain arranged between the side links of the chain on the chain pins intermediate said supporting chain wheels, all of said chain wheels being of the same size and meshing with their respective sprocket wheels and said chain wheels being wider than the teeth of said sprocket wheels with the excess width extending beyond their respective sprocket wheels on opposite sides thereof, said chains being guided laterally by the cooperation of the side links of the chains with the faces of said sprocket wheels on the sides thereof opposite to that beyond which the chain wheels extend; a pair of tracks for said chain wheels extending on each side of the stairway up to said sprocket wheel; and a pair of guides extending on each side of the stairway from said track to and overlapping the sprocket wheel along said side thereof beyond which said chain wheels extend.

2. A moving stairway comprising; a plurality of steps; a pair of running gear chains, one on each side of the stairway, connecting said steps together; a pair of sprocket wheels, one on each side of the stairway at one end thereof, around which the chains respectively pass; a chain wheel in each chain for each step arranged between side links of the chain for supporting the step; additional chain wheels in each chain arranged between the side links of the chain on the chain pins intermediate said supporting chain wheels, all of said chain wheels having rubber tires and being of the same size and meshing with the teeth of their respective sprocket wheels and the tires of said chain wheels being wider than the teeth of said sprocket wheels with the excess width extending beyond the inner side of their respective sprocket wheels, said chains being guided laterally by the cooperation of the outer links of the chains with the outer faces of said sprocket wheels; a pair of tracks for said chain wheels extending on each side of the stairway to just short of said sprocket wheel; and a pair of guides extending on each side of the stairway from said track along the inner side of the sprocket wheel at least to the vertical center line of the sprocket wheel for engaging the tires of said chain wheels on their excess width to effect the transition of said chain wheels between said track and sprocket wheel.

SAMUEL GUSTAVE MARGLES.
ANDREW FABULA.

References Cited in the file of this patent

UNITED STATES PATENTS

| Number | Name | Date |
| --- | --- | --- |
| 2,005,067 | Graff-Baker | June 18, 1935 |
| 2,044,158 | Dunlop | June 16, 1936 |
| 2,101,172 | Gegenheimer | Dec. 7, 1937 |
| 2,145,343 | Dempsey | Jan. 31, 1939 |

FOREIGN PATENTS

| Number | Country | Date |
| --- | --- | --- |
| 552,814 | Germany | June 18, 1932 |
| 748,868 | France | Apr. 25, 1933 |